(12) United States Patent
Hatfield

(10) Patent No.: US 10,956,062 B2
(45) Date of Patent: Mar. 23, 2021

(54) AGGREGATING SEPARATE DATA WITHIN A SINGLE DATA LOG WHEREIN SINGLE DATA LOG IS DIVIDED IN A PLURALITY OF BLOCKS ASSIGNED TO PLURALITY OF DIFFERENT STREAMS

(71) Applicant: International Business Machines Corporation, Armonk, NY (US)

(72) Inventor: Brian David Hatfield, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/506,895

(22) Filed: Jul. 9, 2019

(65) Prior Publication Data
US 2021/0011639 A1    Jan. 14, 2021

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0673* (2013.01)

(58) Field of Classification Search
CPC .... G06F 3/0604; G06F 3/0659; G06F 3/0673; G06F 16/23
See application file for complete search history.

(56) References Cited

U.S. PATENT DOCUMENTS

| | | | |
|---|---|---|---|
| 5,737,600 A * | 4/1998 | Geiner | ............... G06F 16/23 |
| 6,353,834 B1 | 3/2002 | Wong et al. | |
| 6,535,949 B1 | 3/2003 | Parker | |
| 6,728,879 B1 | 4/2004 | Atkinson | |
| 7,680,837 B2 | 3/2010 | Yamato | |
| 9,189,487 B2 | 11/2015 | Yu et al. | |
| 9,811,530 B1 | 11/2017 | Bent et al. | |
| 10,198,463 B2 * | 2/2019 | Eidson | ............ G06F 16/2282 |
| 10,430,100 B2 * | 10/2019 | Barber | ............... G06F 3/0673 |
| 2018/0107402 A1 | 4/2018 | Pogosyan et al. | |

OTHER PUBLICATIONS

Kato et al., "Design and Implementation of Parallel File Aggregation Mechanism," ACM, ROSS' 11, May 31, 2011, pp. 33-40.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.

* cited by examiner

*Primary Examiner* — Tammara R Peyton
(74) *Attorney, Agent, or Firm* — Zilka-Kotab, P.C.

(57) ABSTRACT

A computer-implemented method according to one embodiment includes creating a single data log; storing data from a plurality of different data streams in at least one data unit of the single data log; and allocating an additional data unit to the single data log in response to one or more criteria.

20 Claims, 8 Drawing Sheets

US 10,956,062 B2

AGGREGATING SEPARATE DATA WITHIN A SINGLE DATA LOG WHEREIN SINGLE DATA LOG IS DIVIDED IN A PLURALITY OF BLOCKS ASSIGNED TO PLURALITY OF DIFFERENT STREAMS

BACKGROUND

The present invention relates to data storage, and more specifically, this invention relates to storing data efficiently within a data log.

Data logs are a popular way to implement the storage of data within a system. Currently, data from separate data streams is stored within separate data logs. However, each time one of the separate data logs needs to grow in size, a processor and storage resource-intensive allocation operation needs to be performed.

SUMMARY

A computer-implemented method according to one embodiment includes creating a single data log; storing data from a plurality of different data streams in at least one data unit of the single data log; and allocating an additional data unit to the single data log in response to one or more criteria.

According to another embodiment, a computer program product for aggregating disparate data within a single data log includes a computer readable storage medium having program instructions embodied therewith, where the computer readable storage medium is not a transitory signal per se, and where the program instructions are executable by a processor to cause the processor to perform a method including creating, by the processor, a single data log; storing, by the processor, data from a plurality of different data streams in at least one data unit of the single data log; and allocating, by the processor, an additional data unit to the single data log in response to one or more criteria.

According to another embodiment, a system includes a processor, and logic integrated with the processor, executable by the processor, or integrated with and executable by the processor, where the logic is configured to create a single data log; store data from a plurality of different data streams in at least one data unit of the single data log; and allocate an additional data unit to the single data log in response to one or more criteria.

Other embodiments and embodiments of the present invention will become apparent from the following detailed description, which, when taken in conjunction with the drawings, illustrate by way of example the principles of the invention.

DETAILED DESCRIPTION

Figure 1:
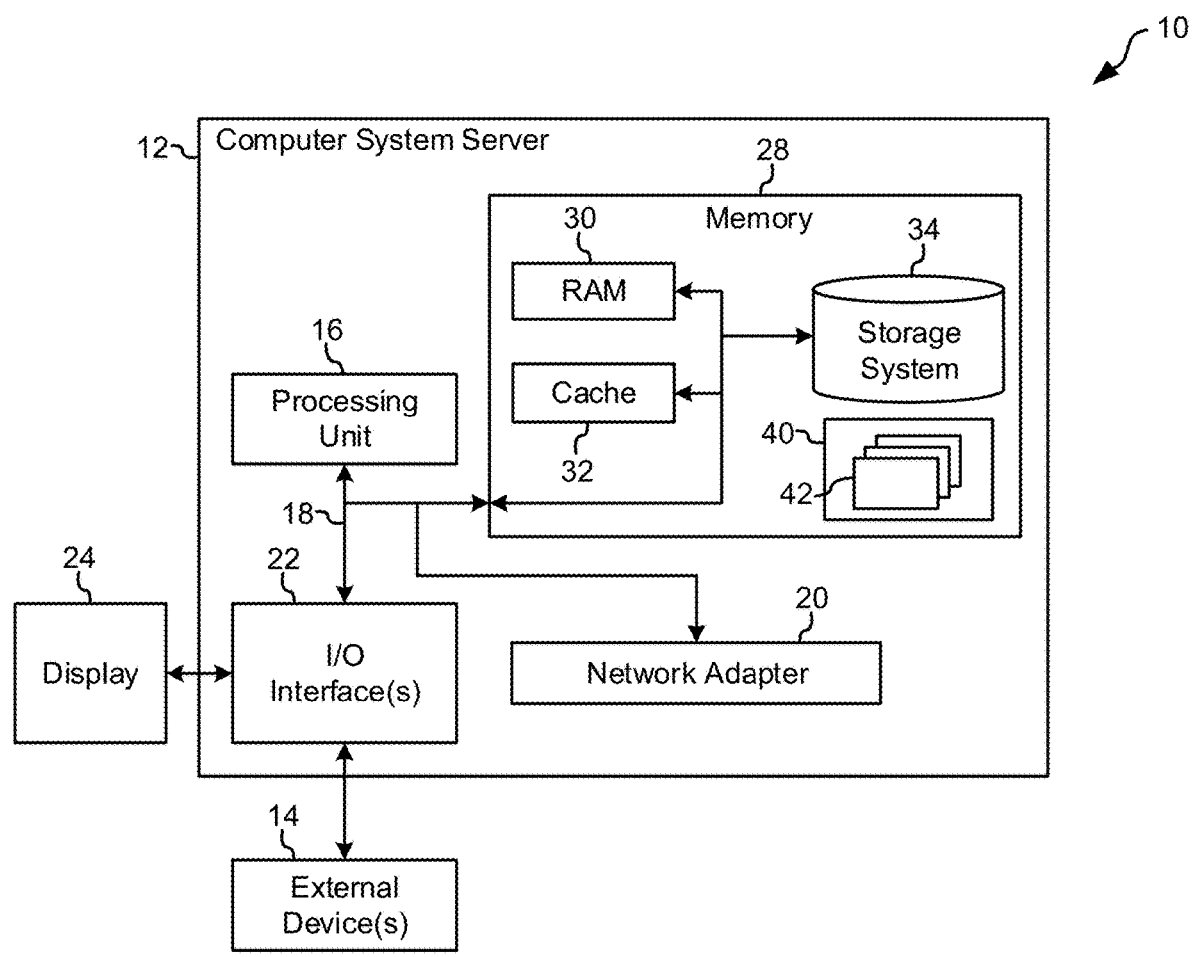
FIG. 1 depicts a cloud computing node according to one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for aggregating disparate data within a single data log.

In one general embodiment, a computer-implemented method includes creating a single data log; storing data from a plurality of different data streams in at least one data unit of the single data log; and allocating an additional data unit to the single data log in response to one or more criteria.

In another general embodiment, a computer program product for aggregating disparate data within a single data log includes a computer readable storage medium having program instructions embodied therewith, where the computer readable storage medium is not a transitory signal per se, and where the program instructions are executable by a processor to cause the processor to perform a method including creating, by the processor, a single data log; storing, by the processor, data from a plurality of different data streams in at least one data unit of the single data log; and allocating, by the processor, an additional data unit to the single data log in response to one or more criteria.

In another general embodiment, a system includes a processor, and logic integrated with the processor, executable by the processor, or integrated with and executable by the processor, where the logic is configured to create a single data log; store data from a plurality of different data streams in at least one data unit of the single data log; and allocate an additional data unit to the single data log in response to one or more criteria.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
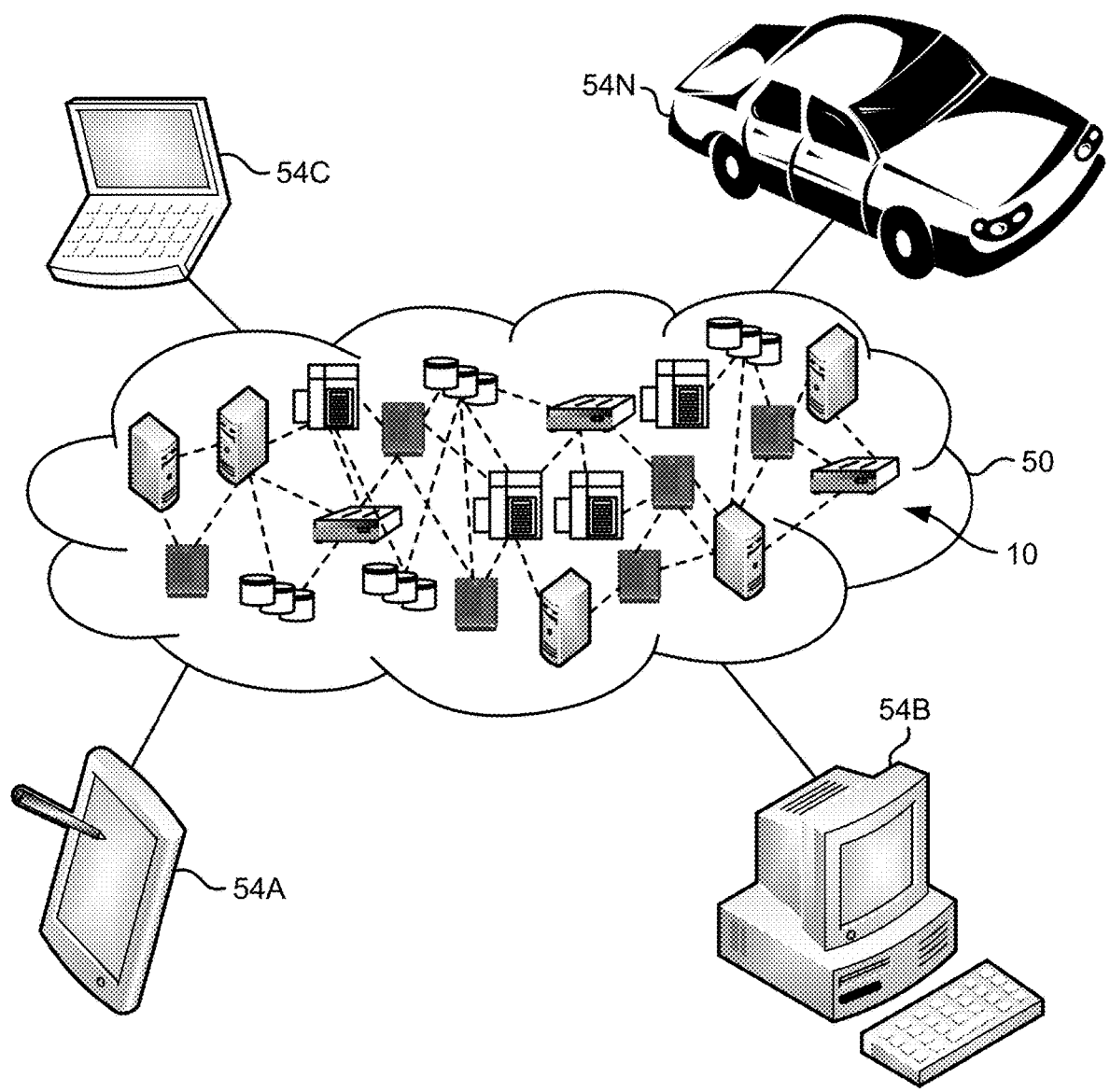
FIG. 2 depicts a cloud computing environment according to one embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
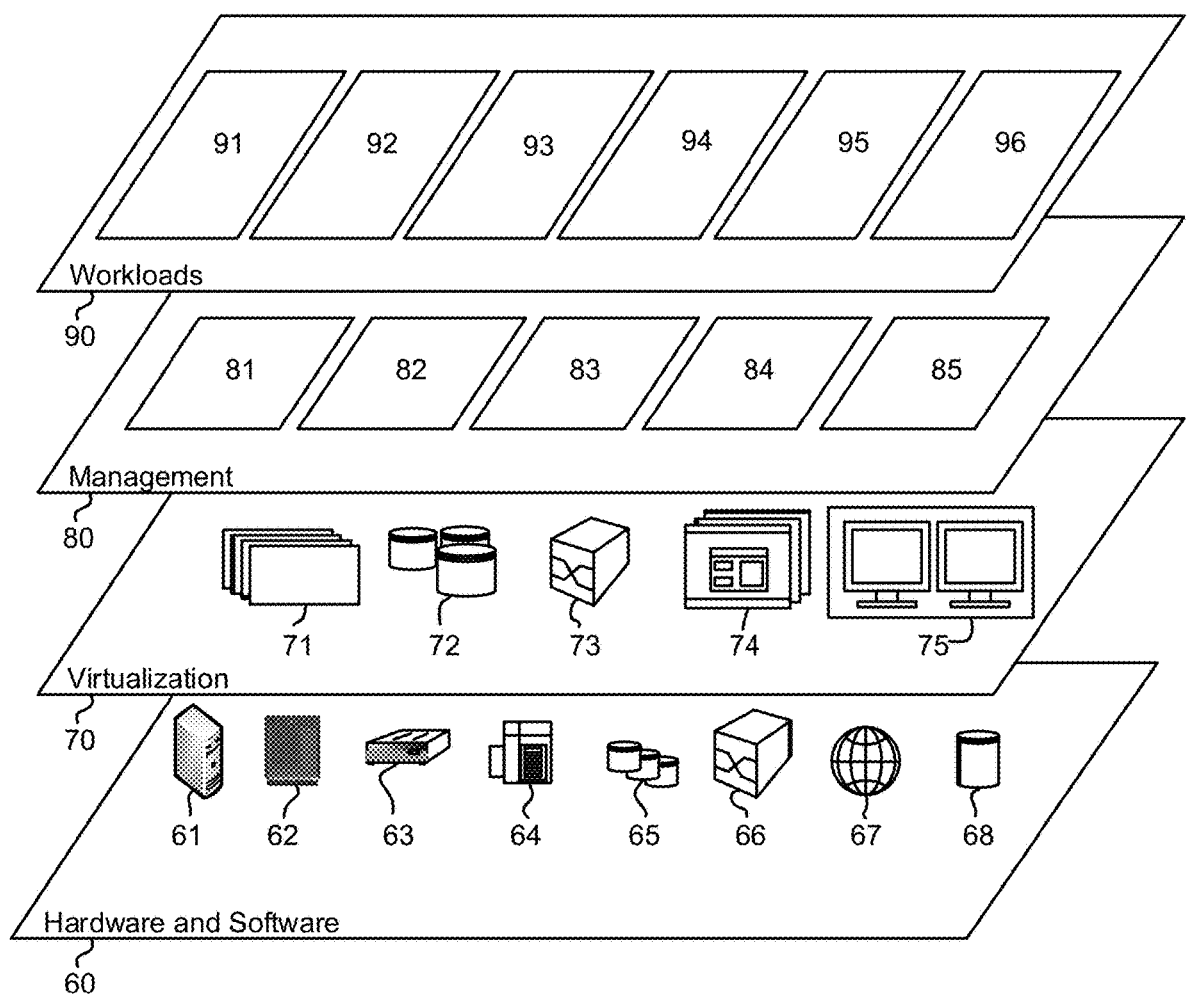
FIG. 3 depicts abstraction model layers according to one embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log data storage 96.

Figure 4:
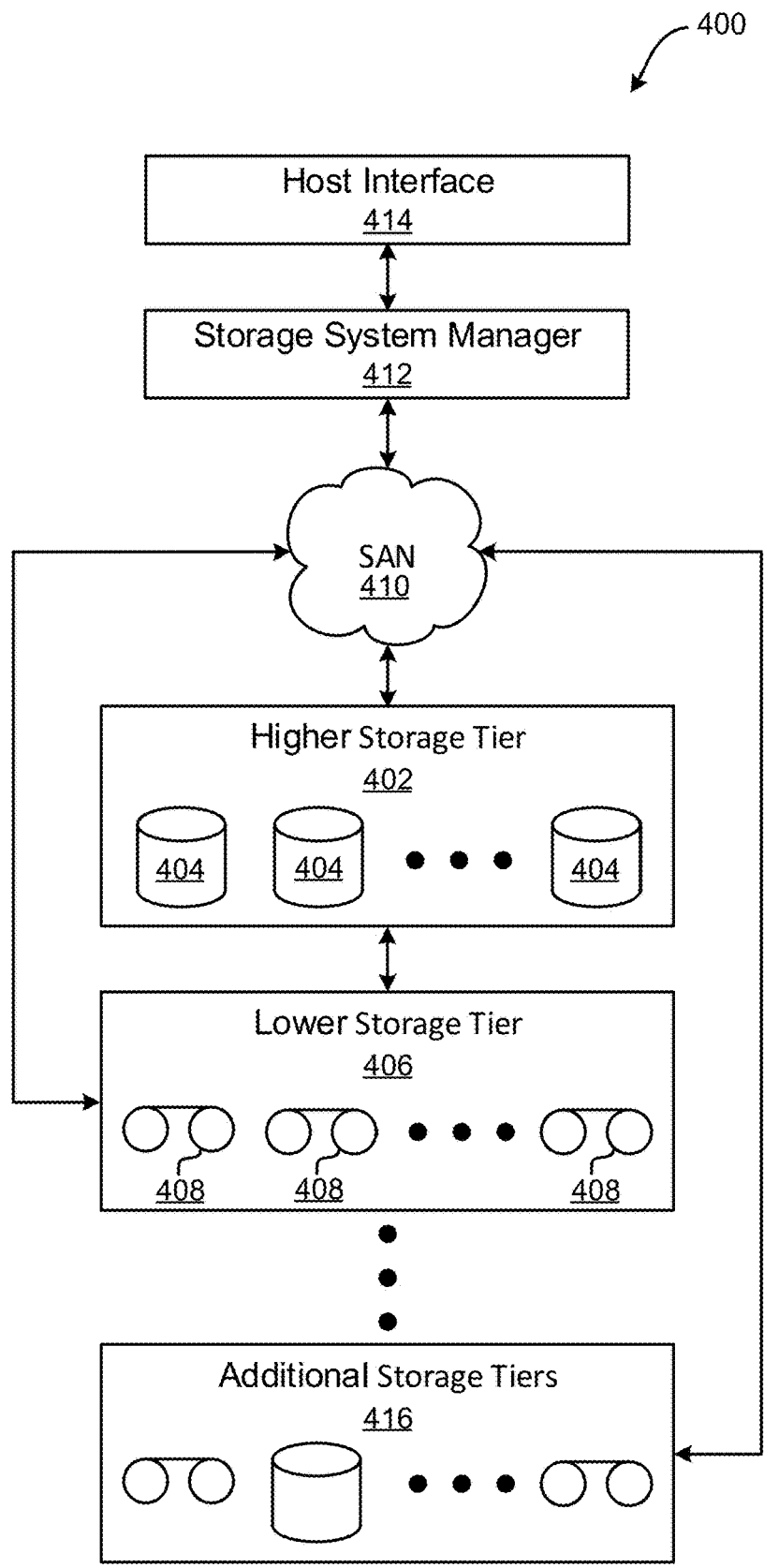
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
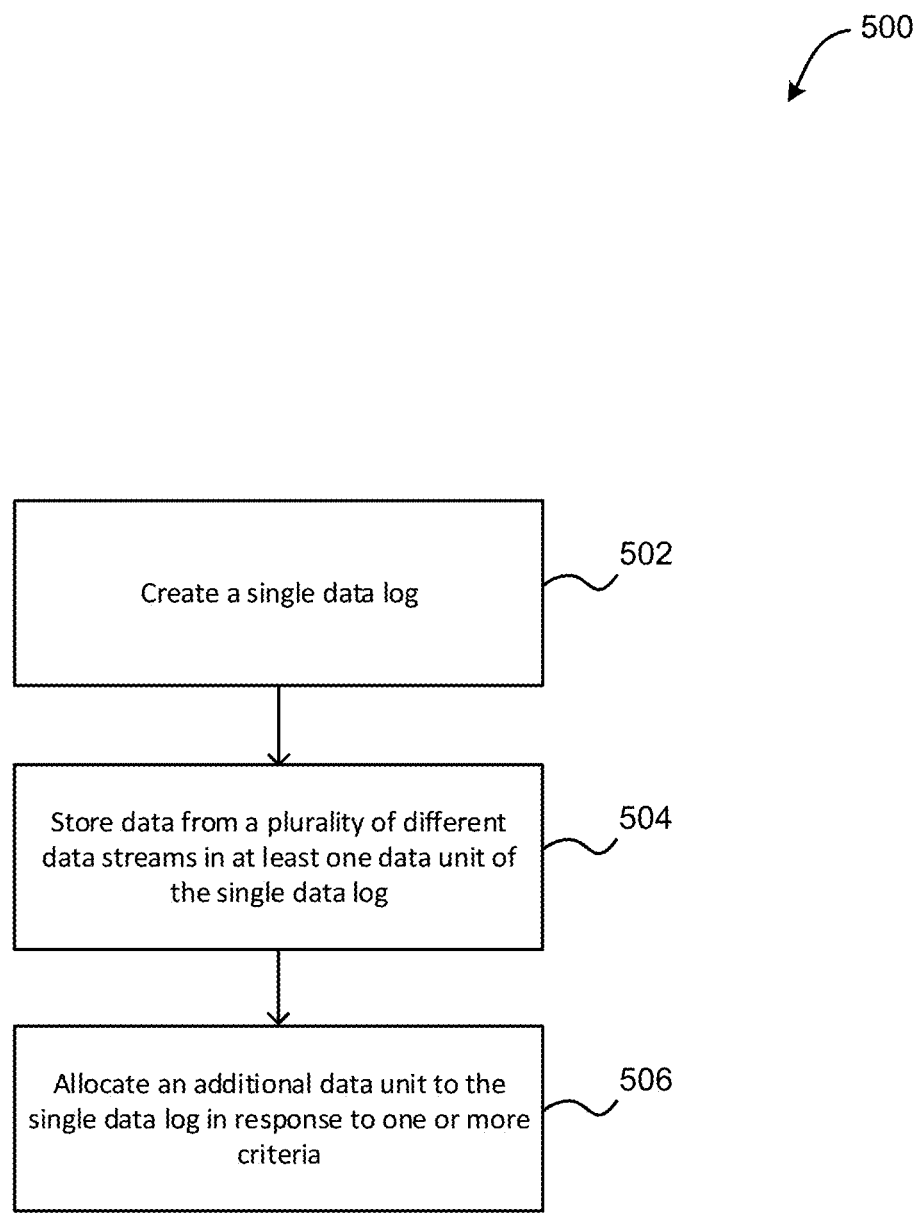
FIG. 5 illustrates a flowchart of a method for aggregating separate data within a single data log, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a single data log is created. In one embodiment, a data log may include a predetermined data structure that stores data. In another embodiment, the data log may store data as a sequential list in chronological order. In yet another embodiment, as data is written to the data log, the written data is appended to the end of the data log. In another embodiment, the single data log may include at least one data unit. For example, the single data log may not have any space assigned to it when it is created, and the at least one data unit may be assigned to the single data log when the single data log is written to.

Additionally, in one embodiment, the data log may grow as data is appended to it. In another embodiment, the single data log may be created within a storage system. For example, the storage system may include a single computing device. In another example, the storage system may include multiple connected storage devices (e.g., a distributed storage system, etc.).

Further, in one embodiment, the single data log may include a log-structured array. For example, the log structured array may include a means of organizing data within a storage environment. In another embodiment, the at least one data unit may include a predetermined amount of storage that is allocated to the single data log. For example, the storage may include one or more of physical storage, virtual storage, cloud-based storage, etc. In another example, the storage may include storage within the storage system.

Further still, in one embodiment, in one embodiment, the at least one data unit may be initially provisioned to the single data log in response to the writing of data to the single data log. In another embodiment, the at least one data unit may be initially provisioned to the single data log in response to a creation of the data log. For example, a provisioning event may be implemented for the single data log, and the provisioning event may assign the at least one data unit to the single data log. In another example, data may be stored within the at least one data unit once the at least one data unit is assigned to the single data log. In another embodiment, each data unit may have a predetermined size.

Also, method 500 may proceed with operation 504, where data from a plurality of different data streams is stored in at least one data unit of the single data log. In one embodiment, each of the plurality of data streams may include a source of data to be stored. For example, a data stream may include an application that creates data, a module that identified, parses, and/or sorts existing data, an existing storage location from which data is migrated, etc. In another embodiment, the data from one of the plurality of data streams may have different characteristics from the data from another of the plurality of data streams. For example, data from each of the plurality of data streams may have a different name, type, size, etc. when compared to data from the other data streams. In another example, the data from one of the plurality of different data streams has a different source than the data from another of the plurality of different data streams. In yet another example, the data from one of the plurality of different data streams is from a same source, but a different time, than the data from another of the plurality of different data streams.

In addition, in one embodiment, the data from each of the plurality of different data streams may be stored separately from the data from the other streams. In another embodiment, the data from each of the plurality of different data streams may be stored as blocks within the at least one data unit. In yet another embodiment, the data may be stored within the at least one data unit utilizing alternating blocks.

For example, each data unit within the single data log may be divided into a plurality of blocks, where the blocks have a size smaller than the single data log. In another example, the single data log may be divided into a predetermined number of blocks. In yet another example, each of the plurality of blocks may be assigned to one of the plurality of different data streams.

Furthermore, in one example, the plurality of blocks may be assigned to one of the plurality of different data streams in a rotating order (e.g., utilizing a modulo operation). In another example, each of the plurality of blocks may be sequentially numbered, and each of the different data streams may be sequentially numbered. In yet another example, the sequential number of a given block may be divided by a total number of the plurality of different data streams, and the remainder may indicate the number of the data stream that can utilize that block for data storage. The data may be retrieved by each of the different data streams utilizing the same modulo operation.

Further still, in one embodiment, the data may be stored within the at least one data unit utilizing one or more identifiers. For example, when a predetermined data stream writes data as a block to the at least one data unit, metadata identifying that predetermined data stream may also be written to the block. In another example, blocks written by the predetermined data stream may be identified within the single data log by parsing data blocks within the data log and filtering metadata according to predetermined criteria (e.g., the identifier of the predetermined data stream, etc.). In yet another example, a separate data log may be created for the predetermined data stream by parsing all data blocks within the data log, identifying all data blocks within the data log having an identifier of the predetermined data stream, extracting the identified data, and adding the extracted data to the newly created separate data log.

Also, method 500 may proceed with operation 506, where an additional data unit is allocated to the single data log in response to one or more criteria. In one embodiment, the one or more criteria may include determining that the at least one data unit is full. In another embodiment, the one or more criteria may include determining that a data unit is unallocated. In one embodiment, an available amount of data within the at least one data unit may be compared to a threshold amount. For example, the available amount of data is less than the threshold, the additional data unit may be allocated to the single data log. In another example, if the available amount of data is greater than the threshold, the at least one data unit may be used without allocating additional storage space.

Additionally, in one embodiment, the at least one data unit may be determined to be full in response to an attempt to reference a data block beyond a last allocated block of the at least one data unit. In another embodiment, the additional data unit may have a predetermined size. In yet another embodiment, the additional data unit may have the same size as the at least one data unit initially allocated to the single data log.

Further, in one embodiment, a predetermined amount of space may be reserved at a beginning of the single data log, and the predetermined amount of space may store metadata including a number of the plurality of different data streams, a data block size, and a number of data blocks used by each of the plurality of data streams. In another embodiment, the metadata may be utilized to determine a number of fixed-size data units allocated to the single data log. In yet another embodiment, the number of the plurality of different data streams from the metadata may be used to determine a number (e.g. an identifier, etc.) of a data stream that can utilize a certain block for data storage within the single data log.

In this way, an amount of storage space needed to store data from each of the plurality of different data streams may be reduced. For example, instead of storing each of the plurality of data streams in a separate data log, the data from all of the streams may be stored in a single data log. By performing (process and storage resource-intensive) additional data unit allocations within a single data log instead of multiple data logs, a number of times such allocations need to be performed may be aggregated and minimized, which may reduce an amount of storage space utilized within a storage system, and which may improve a performance of the storage system. Also, a number of log definitions may be reduced, which may also increase an amount of available storage space within a system implementing the logs.

Figure 6:
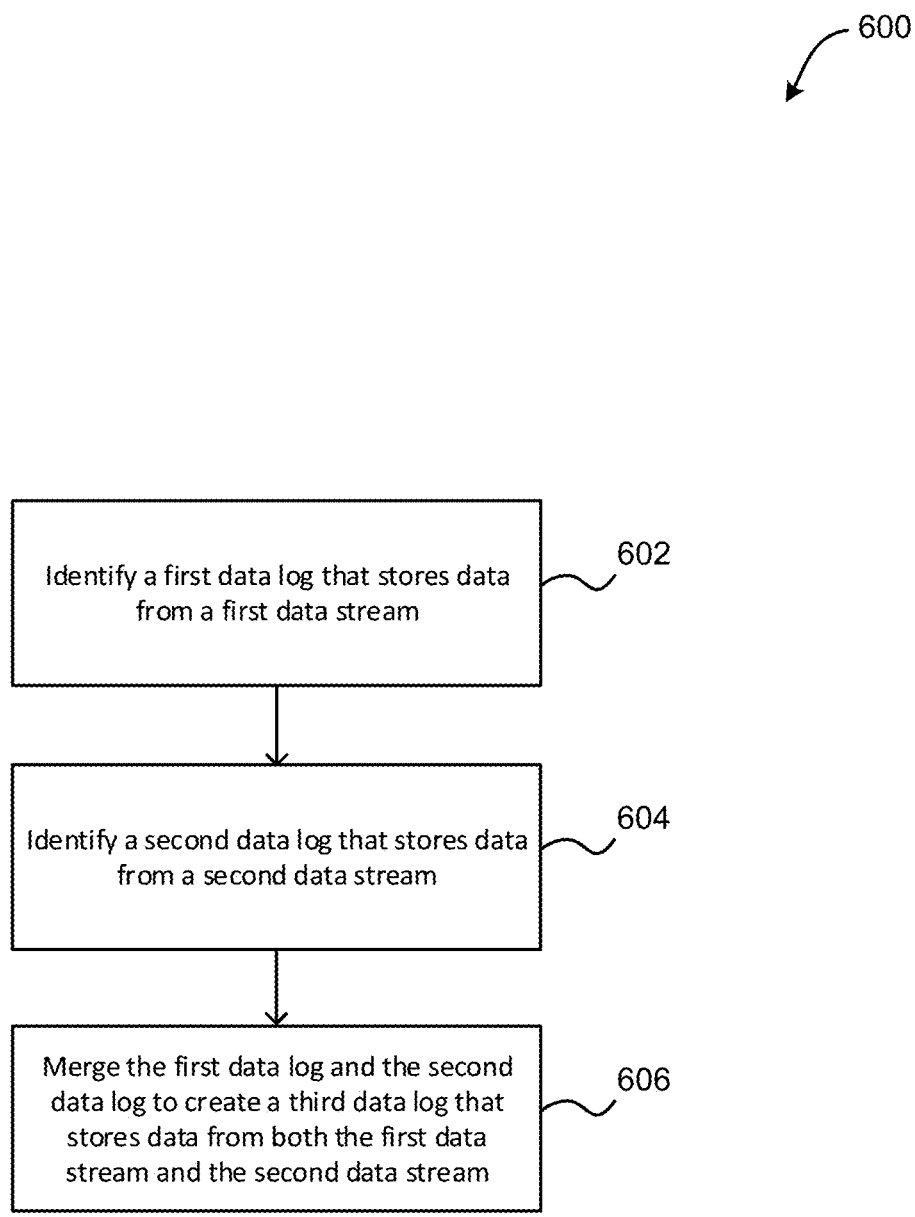
FIG. 6 illustrates a flowchart of a method for merging data logs within a storage environment, in accordance with one embodiment of the present invention.

Now referring to FIG. 6, a flowchart of a method 600 for merging data logs within a storage environment is shown according to one embodiment. The method 600 may be performed in accordance with the present invention in any of the environments depicted in FIGS. 1-4 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a first data log that stores data from a first data stream is identified. Additionally, method 600 may proceed with operation 604, where a second data log that stores data from a second data stream is identified. Further, method 600 may proceed with operation 606, where the first data log and the second data log are merged to create a third data log that stores data from both the first data stream and the second data stream.

In one embodiment, data from the first stream and data from the second stream may be stored within the at least one data unit utilizing alternating blocks, as explained above. In another embodiment, data from the first stream and data from the second stream may be stored within the at least one data unit utilizing one or more identifiers, as explained above. In yet another embodiment, the first data log and the second data log may be removed from the storage system (e.g., deleted, etc.) once the merging has been completed.

In this way, instead of having two separate data logs for two separate data streams, data from the two separate data streams may be merged into a single data log. As a result, instead of allocating sizeable additional data units to both the first data log and the second data log as those logs become full, additional units need only be allocated to a single third data log, which may reduce an amount of storage space and computing resources necessary to implement the storage of data from the first and second data streams.

Figure 7:
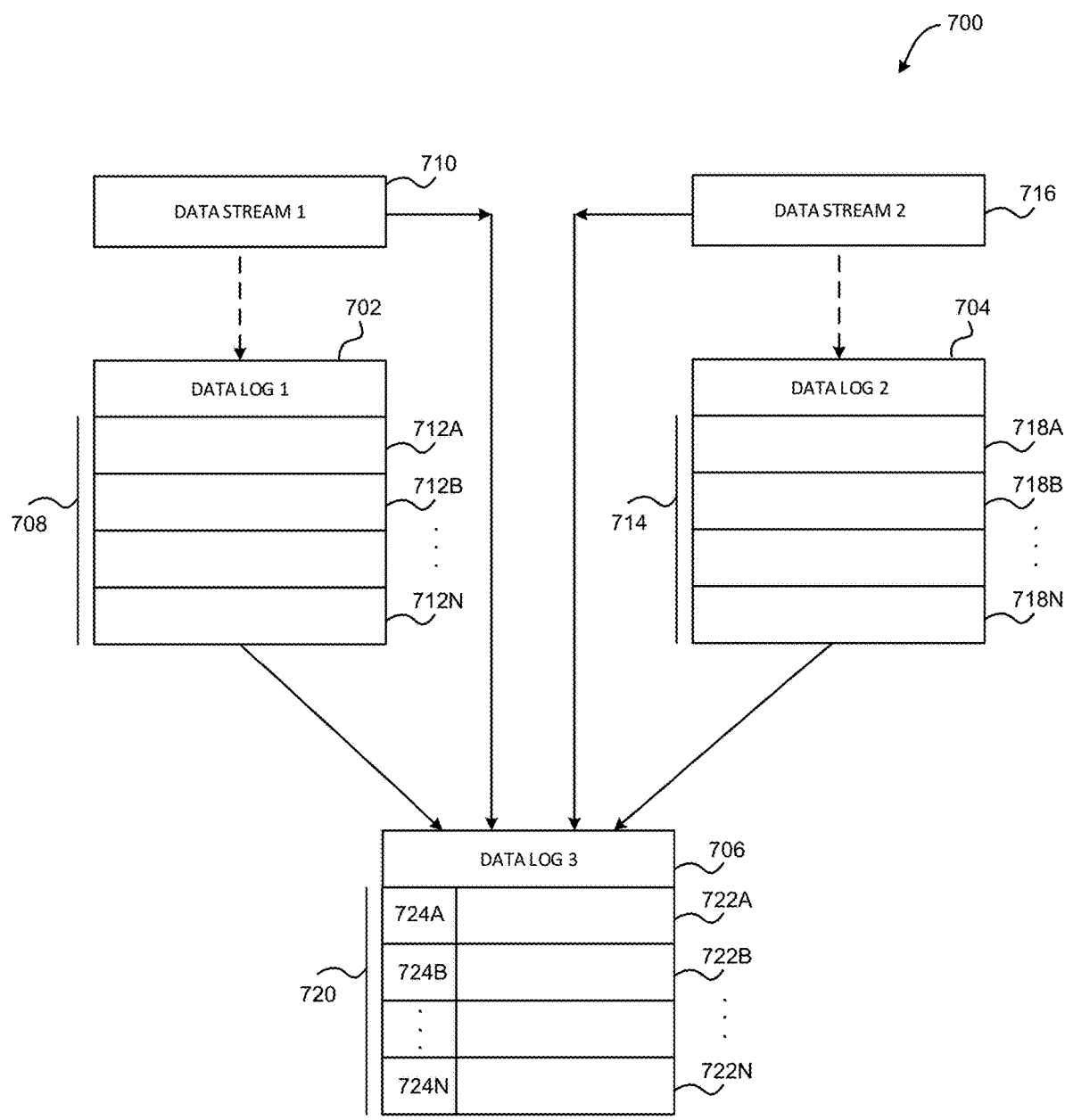
FIG. 7 illustrates an exemplary merging of a first data log and a second data log to create a third data log, in accordance with one embodiment of the present invention.

FIG. 7 illustrates an exemplary merging 700 of a first data log 702 and a second data log 704 to create a third data log 706, according to one exemplary embodiment. As shown, the first data log 702 includes a first allocated data unit 708 that was allocated to the first data log 702 when the log was created. The first data log 702 is associated with a first data stream 710, and as data is received from the first data stream 710 it is written into blocks 712A-712N of the first allocated data unit 708.

Likewise, the second data log 704 includes a second allocated data unit 714 that was allocated to the second data log 704 when the log was created. The second data log 704 is associated with a second data stream 716, and as data is received from the second data stream 716 it is written into blocks 718A-718N of the second allocated data unit 714.

Additionally, data from blocks 712A-712N of the first allocated data unit 708 and data from the blocks 718A-718N of the second allocated data unit 714 are migrated to the third allocated data unit 720 of the third data log 706. For example, all data from blocks 712A-712N of the first allocated data unit 708 and data from the blocks 718A-718N of the second allocated data unit 714 may be added as blocks 722A-N.

In one embodiment, an identifier of the data stream associated with the migrated data may be stored as metadata 724A-N within the blocks 722A-N of the third allocated data unit 720. In another embodiment, the migrated data may be stored in an alternating fashion within the third allocated data unit 720.

In one embodiment, the third allocated data unit 720 may be allocated to the third data log 706 in response to the creation of the third data log 706.

Further, in one embodiment, the first data stream 710 and the second data stream 716 may be redirected to the third data log 706, such that future data sent from the first data stream 710 and the second data stream 716 is received by and stored at the third data log 706. In another embodiment, in response to the migration of the data from the blocks 712A-712N of the first allocated data unit 708 and data from the blocks 718A-718N of the second allocated data unit 714 to the third allocated data unit 720 of the third data log 706, the first data log 702 and the second data log 704 may be deleted from the system.

In this way, instead of allocating additional data units to both the first data log 702 and the second data log 704 as their respective allocated data units 708 and 714 are filled, additional data units only need to be allocated to the third data log 706 as its third allocated data unit 720 is filled. This reduces a number of times that time and resource-expensive allocations are performed within a system, which improves a performance of a system implementing the third data log 706.

Space-Efficient Log Aggregation

A log is a data structure that grows as data is appended to it. When a log is created it need not have any space assigned to it. When a log is written, space must be assigned to it to store the data written. In this way space is assigned to a log as needed. The amount of space assigned to a log can vary. A fixed-sized space unit is often employed to simplify space management. A large fixed-size can cause much more space to be allocated than needed, but can save time by requiring fewer allocations.

In some scenarios it is useful to have multiple logs. For example, one log for a copy that is ongoing and another containing a copy that has completed. A completed copy is available for restoration while a more current copy is created.

One solution creates two logs, one for each copy, each log requiring at least one allocation unit to store data. A third log stores metadata indicating which log contains a more recent copy for restoration. This solution requires at least three data unit allocations, one for each log, and three log definitions, one for each log.

Another solution is to store all related metadata and data "logs" in one log. A log stored within a log will henceforth be referred to as a sub-log. A fixed size metadata sub-log is located at the beginning and zero to n data sub-logs are stored after it. A log is divided into fixed sized units, henceforth called blocks, each is much smaller than a log allocation unit. Successive blocks belong to alternating logs.

In one embodiment, some amount of space is reserved at the beginning of the log to store metadata. The metadata size can be defined when the log is created and stored in the metadata itself or it can be a constant size. Metadata may contain things like its version number and a count of used blocks for each sub-log.

In another embodiment, each sub-log is composed of the blocks whose number modulo the number of logs equal the sub-log's number. For example, suppose a log has two data sub-logs. Block 0 is data sub-log 0's first. Block 1 is data sub-log 1's first. Block 2 is data sub-log 0's second. Block 3 is data sub-log 1's second. And so on. In this way each log gets 1/data sub-log count of the blocks.

This solution may be most space-efficient if data logs are similar in size. It requires no record be maintained of which, if any, sub-log owns each block. It allows sub-logs, like logs, to grow indefinitely. A user need not define its size at creation.

Whenever a user attempts to reference any sub-log block beyond the log's last allocated unit, an allocation is triggered. If space is unavailable an exception is raised, otherwise the sub-log block is accessed. If only one log may be grown at a time, then a serialization is not required, otherwise a method such as a lock is used to make the block address query and log growth atomic.

Figure 8:
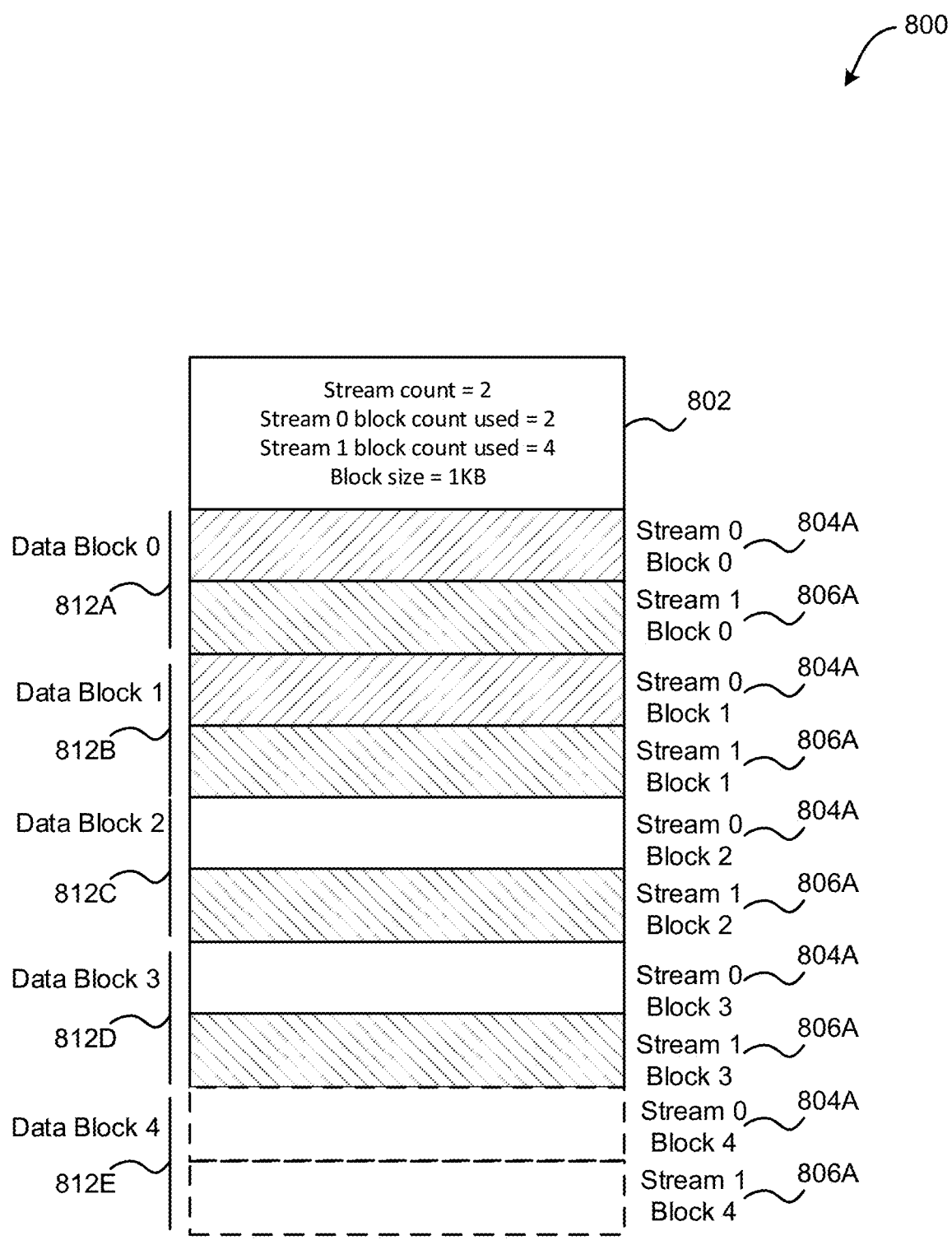
FIG. 8 illustrates an exemplary data log containing data from two separate streams, in accordance with one embodiment of the present invention.

FIG. 8 illustrates an exemplary data log 800 containing data from two separate streams, in accordance with one embodiment. As shown, the data log 800 includes a metadata block 802 followed by stream data 804A-B and 806A-D where the stream data is alternated between blocks 804A-B and 806A-D.

In one embodiment, the metadata block 802 contains metadata including a stream count, each streams' used block count, and a block size. In the current example, the stream count is equal to two, the used block count for data stream 0 is two, the used block count for data stream 1 is four, and the stream block size is 1 KB.

In another embodiment, when the log 800 is created, its stream count and stream block size are defined within the metadata block 802. Each time a stream writes a block, its used count is incremented within the metadata block 802. In the current example, the metadata block 802 indicates that data stream 0 has written two blocks 804A-B, while data stream 1 has written four blocks 806A-D. The data log 800 also includes unused blocks 808A-B, as well as unallocated data blocks 810A-B. Data blocks 812A-E may be larger than stream blocks—in this example, they are twice the size (2 KB). Each time an unallocated block 810A-B is written, it is allocated space for both data stream 1 and data stream 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    creating a single data log;
    dividing at least one data unit of the single data log into a plurality of blocks, where each of the plurality of blocks is assigned to one of a plurality of different data streams in a rotating order utilizing a predetermined operation;
    storing data from the plurality of different data streams in the at least one data unit of the single data log; and
    allocating an additional data unit to the single data log in response to one or more criteria.

2. The computer-implemented method of claim 1, wherein the one or more criteria include determining that the at least one data unit is full.

3. The computer-implemented method of claim 1, wherein the one or more criteria include determining that a data unit is unallocated.

4. The computer-implemented method of claim 1, wherein the single data log stores data as a sequential list in chronological order.

5. The computer-implemented method of claim 1, wherein as data is written to the single data log, the written data is appended to an end of the single data log.

6. The computer-implemented method of claim 1, wherein the at least one data unit is provisioned to the single data log in response to a writing of the data to the single data log.

7. The computer-implemented method of claim 1, wherein each of the plurality of different data streams includes a source of data to be stored.

8. The computer-implemented method of claim 1, wherein the data from one of the plurality of different data streams has different characteristics from the data from another of the plurality of different data streams.

9. The computer-implemented method of claim 1, wherein the data from one of the plurality of different data streams has a different source than the data from another of the plurality of different data streams.

10. The computer-implemented method of claim 1, wherein the data from one of the plurality of different data streams is from a same source, but a different time, than the data from another of the plurality of different data streams.

11. The computer-implemented method of claim 1, wherein the predetermined operation includes a modulo operation, where:
    each of the plurality of blocks is sequentially numbered,
    each of the plurality of different data streams is sequentially numbered, and
    the sequential number of a given block is divided by a total number of the plurality of different data streams, and the remainder indicates a number of one of the plurality of different data streams that utilizes the given block for data storage.

12. The computer-implemented method of claim 1, wherein the data is stored within the at least one data unit utilizing one or more identifiers.

13. The computer-implemented method of claim 1, wherein the additional data unit is allocated to the single data log in response to determining that an available amount of data is less than a threshold amount.

14. The computer-implemented method of claim 1, wherein in response to determining that a predetermined data stream writes data as a block to the at least one data unit, metadata identifying that predetermined data stream is also written to the block.

15. The computer-implemented method of claim 1, further comprising:
    reserving a predetermined amount of space at a beginning of the single data log, where the predetermined amount of space stores metadata including:

a number of the plurality of different data streams,
a data block size, and
a number of data blocks used by each of the plurality of different data streams;
determining a number of fixed-size data units allocated to the single data log, utilizing the metadata; and
utilizing the number of the plurality of different data streams from the metadata to determine an identifier of a data stream that can utilize a block for data storage within the single data log.

16. The computer-implemented method of claim 1, further comprising merging a first data log that stores data from a first data stream and a second data log that stores data from a second data stream to create the single data log.

17. The computer-implemented method of claim 1, further comprising:
defining, within a metadata block of the single data log:
a count of a total number of the plurality of different data streams,
a stream block size for each of the plurality of blocks, and
a count, for each of the plurality of different data streams, of a number of blocks written to the single data log by the data stream;
in response to identifying a write to a block within the single data log by one of the plurality of different data streams, incrementing the count of the number of blocks written to the single data log by the corresponding data stream.

18. A computer program product for aggregating disparate data within a single data log, the computer program product comprising a computer readable storage medium having program instructions embodied therewith, wherein the computer readable storage medium is not a transitory signal per se, the program instructions executable by a processor to cause the processor to perform a method comprising:
creating, by the processor, a single data log;
dividing, by the processor, at least one data unit of the single data log into a plurality of blocks, where each of the plurality of blocks is assigned to one of a plurality of different data streams in a rotating order utilizing a predetermined operation;
storing, by the processor, data from the plurality of different data streams in the at least one data unit of the single data log; and
allocating, by the processor, an additional data unit to the single data log in response to one or more criteria.

19. The computer program product of claim 18, wherein the single data log stores data as a sequential list in chronological order.

20. A system, comprising:
a processor; and
logic integrated with the processor, executable by the processor, or integrated with and executable by the processor, the logic being configured to:
create a single data log;
divide at least one data unit of the single data log into a plurality of blocks, where each of the plurality of blocks is assigned to one of a plurality of different data streams in a rotating order utilizing a predetermined operation;
store data from the plurality of different data streams in the at least one data unit of the single data log; and
allocate an additional data unit to the single data log in response to one or more criteria.

* * * * *